(12) United States Patent
Barnett et al.

(10) Patent No.: US 6,798,591 B2
(45) Date of Patent: Sep. 28, 2004

(54) REFERENCE CIRCUIT FOR WRITE DRIVER CIRCUIT WITH PROGRAMMABLE WRITE CURRENT, OVERSHOOT DURATION AND OVERSHOOT AMPLITUDE CONTROL

(75) Inventors: Raymond Elijah Barnett, Apply Valley, MN (US); Tuan Van Ngo, Eden Prairie, MN (US); Scott Gary Sorenson, Lakeville, MN (US)

(73) Assignee: Texas Instruments Incorporated, Dallas, TX (US)

( * ) Notice: Subject to any disclaimer, the term of this patent is extended or adjusted under 35 U.S.C. 154(b) by 362 days.

(21) Appl. No.: 10/045,425

(22) Filed: Oct. 29, 2001

(65) Prior Publication Data

US 2003/0081339 A1 May 1, 2003

(51) Int. Cl.[7] .................................................. G11B 5/09
(52) U.S. Cl. .............................. 360/46; 360/68; 360/66; 327/110
(58) Field of Search ................................ 327/108, 110; 360/46, 67, 68, 66

(56) References Cited

U.S. PATENT DOCUMENTS 5,331,479 A * 7/1994 Madsen ........................ 360/68

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A write current circuit (40) adapted to drive a thin film write head (L0) of a mass media information storage device. The write current circuit includes a write current reference voltage circuit (42) adapted to selectively establish amplitude of a write current signal. The write current circuit further includes programming circuitry (M5–M10) driven such that several parameters of the write current waveform can be controlled, including the write current amplitude, overshoot amplitude and overshoot duration. The present invention achieves technical advantages by providing the ability to both produce an accurate write current, and also providing the ability to establish the write current waveform shape so that customers can optimize disk drive performance even when using different thin film write heads available from different suppliers.

23 Claims, 4 Drawing Sheets

REFERENCE CIRCUIT FOR WRITE DRIVER CIRCUIT WITH PROGRAMMABLE WRITE CURRENT, OVERSHOOT DURATION AND OVERSHOOT AMPLITUDE CONTROL

FIELD OF THE INVENTION

The present invention is generally related to the field of mass media information storage devices, and more particularly to circuits for controlling the write current used to drive a thin film write head.

BACKGROUND OF THE INVENTION

Hard disk drives are mass storage devices that include a magnetic storage media, e.g. rotating disks or platters, a spindle motor, read/write heads, an actuator, a pre-amplifier, a read channel, a write channel, a servo circuit, and control circuitry to control the operation of hard disk drive and to properly interface the hard disk drive to a host system or bus. FIG. 1 shows an example of a prior art disk drive mass storage system 10. Disk drive system 10 interfaces with and exchanges data with a host 32 during read and write operations. Disk drive system 10 includes a number of rotating platters 12 mounted on a base 14. The platters 12 are used to store data that is represented as magnetic transitions on the magnetic platters, with each platter 12 coupleable to a head 16 which transfers data to and from a preamplifier 26. The preamp 26 is coupled to a synchronously sampled data (SSD) channel 28 comprising a read channel and a write channel, and a control circuit 30. SSD channel 28 and control circuit 30 are used to process data being read from and written to platters 12, and to control the various operations of disk drive mass storage system 10. Host 32 exchanges digital data with control circuit 30.

Data is stored and retrieved from each side of the magnetic platters 12 by heads 16 which comprise a read head 18 and a write head 20 at the tip thereof. The conventional readhead 18 and writehead 20 comprise magneto-resistive heads adapted to read or write data from/to platters 12 when current is passed through them. Heads 16 are coupled to preamplifier 26 that serves as an interface between read/write heads 18/20 of disk/head assembly 10 and SSD channel 28. The preamp 26 provides amplification to the waveform data signals as needed. A preamp 26 may comprise a single chip containing a reader amplifier 27, a writer amplifier, fault detection circuitry, and a serial port, for example. Alternatively, the preamp 26 may comprise separate components rather than residing on a single chip.

Particular areas for improvements of write driver current circuits used to drive a thin film head include addressing the inaccuracies of the write current, and providing the ability to change the write currents waveform shape so that customers of these circuits can customize the disk drive performance with many variations of thin film write heads provided by different suppliers. That is, there are several available thin film write heads manufactured in the industry, each having it's own drive characteristics and each interfacing slightly differently to the available write drive circuits. Accordingly, there is desired an improved write driver current circuit which can provide both an accurate selectable write current, and which write current can have parameters selectively customized for optimizing disk drive performance.

SUMMARY OF THE INVENTION

The present invention achieves technical advantages as a write current driver circuit adapted to both selectively establish an amplitude of the write current signal, and which tracks multiple variations including process, supply voltages and temperatures, and in addition can be selectively controlled and programmed to control the amplitude, overshoot amplitude, and overshoot duration.

Preferably, the write current driver circuit includes a write current reference voltage circuit, which is adapted to selectively establish amplitude of the write current. Preferably, the write current reference voltage circuit is adapted to set a DC write current to the write head. A very accurate write current can be established and selectively provided to compensate for variations in process, supply voltages and temperature. The write current reference voltage circuit preferably includes a feedback loop feeding back transistor current to achieve loop stability, and preferably includes a feed forward capacitor adapted to stabilize the feedback loop.

A plurality of transistors are provided to control multiple parameters of the write current. Preferably, a first set of transistors provides a boost current to produce a write current overshoot. A second set of transistors provides a differential write data signal. An overshoot amplitude of the write current is programmable by creating a pulsing signal. Using the original differential write data signal and a programmable delay version of the write data generates this signal. Preferably, the pulsing signal's current amplitude is also programmable by a programmable current source. These transistors are preferably biased with a trickle current to increase transient switching time. Moreover, these trickle currents are compensated for in the write current reference voltage circuit to maintain write current accuracy. Preferably, PMOS transistors are provided to control the boost currents and the differential write data signals.

DETAILED DESCRIPTION OF THE PREFERRED EMBODIMENT

Figure 2:
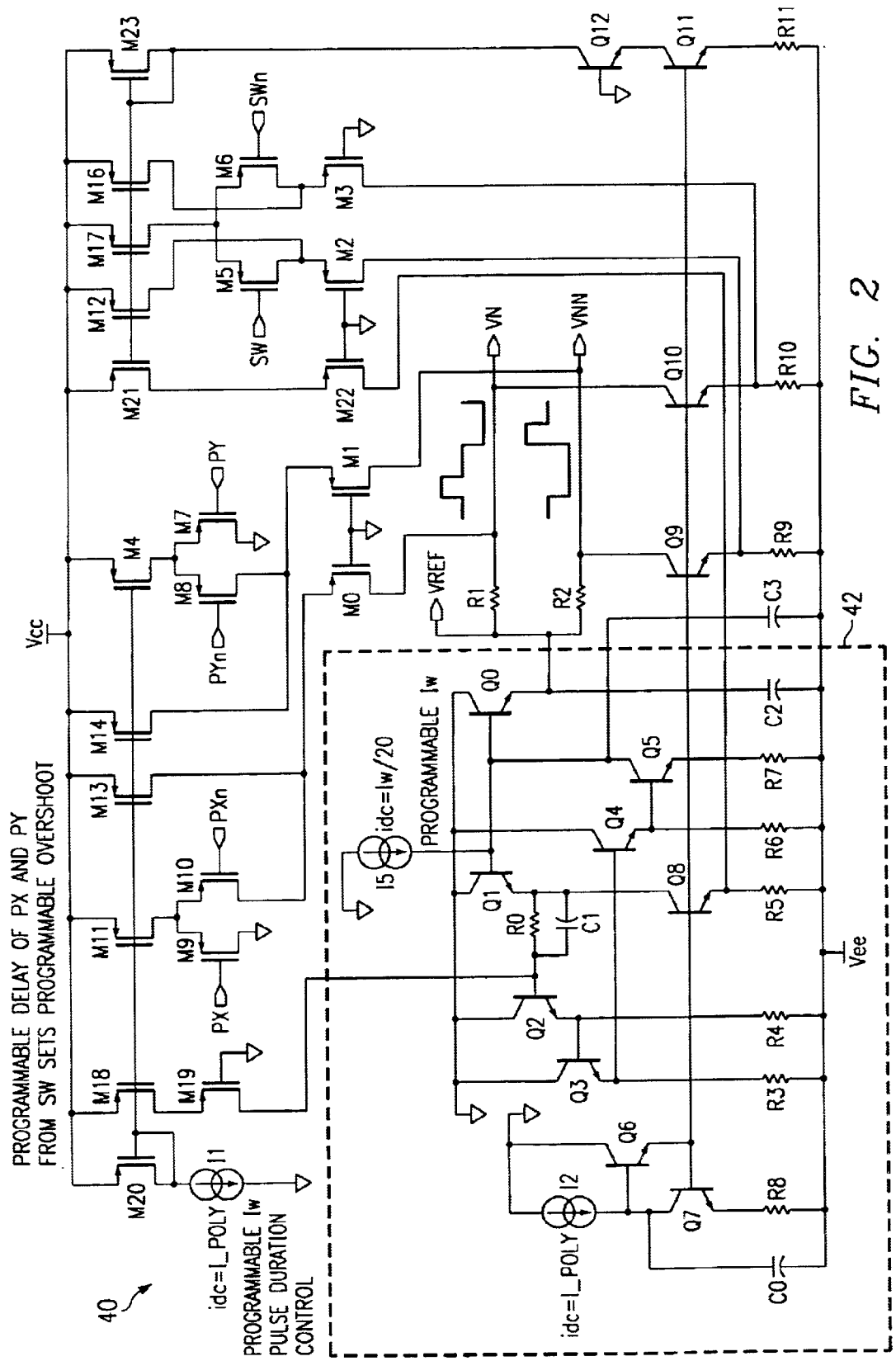
FIG. 2 is a schematic diagram of the present invention seen to include a voltage reference for establishing the write current with programmable write current amplitude, pulse duration and overshoot amplitude control.
Figure 3B:
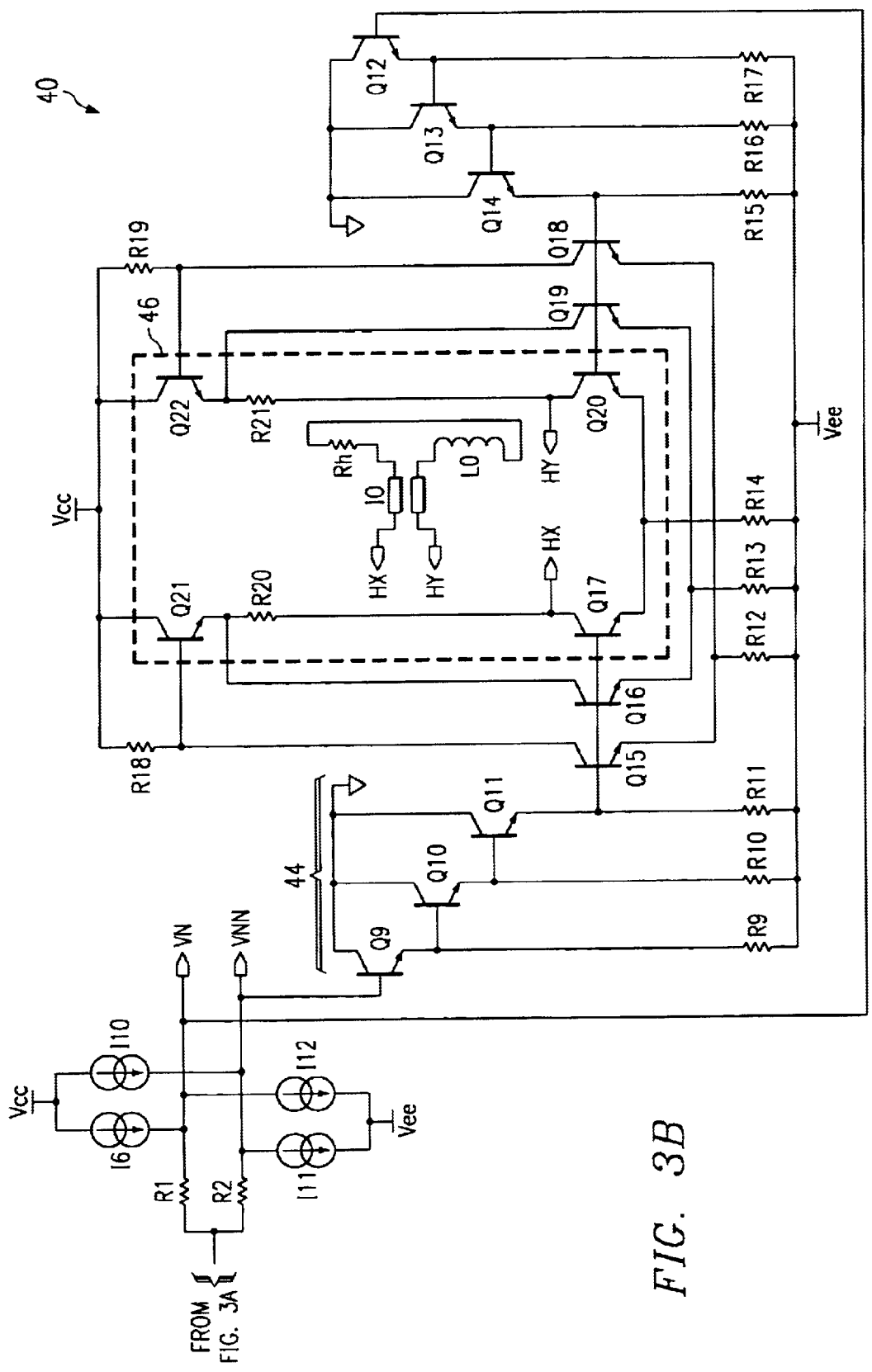

FIG. 2 shows a schematic of a write driver circuit 40 including a write current reference voltage circuit 42, as well as PMOS transistors adapted to selectively program write current amplitude, overshoot duration, and overshoot amplitude. The write current's reference voltage circuit 42, which sets the DC write current, consists of transistors Q0–Q8, resistors R0–R7, capacitors C0–C3, and current source I2, which is created from a bandgap reference voltage dropped across a poly resistor. Current source I5 is used to the program to write current amplitude. Voltage VREF is the output reference voltage, which varies proportional to current I5. Current I5 is preferably set to be equal to the write current divided by 20 for power saving.

Figure 1:
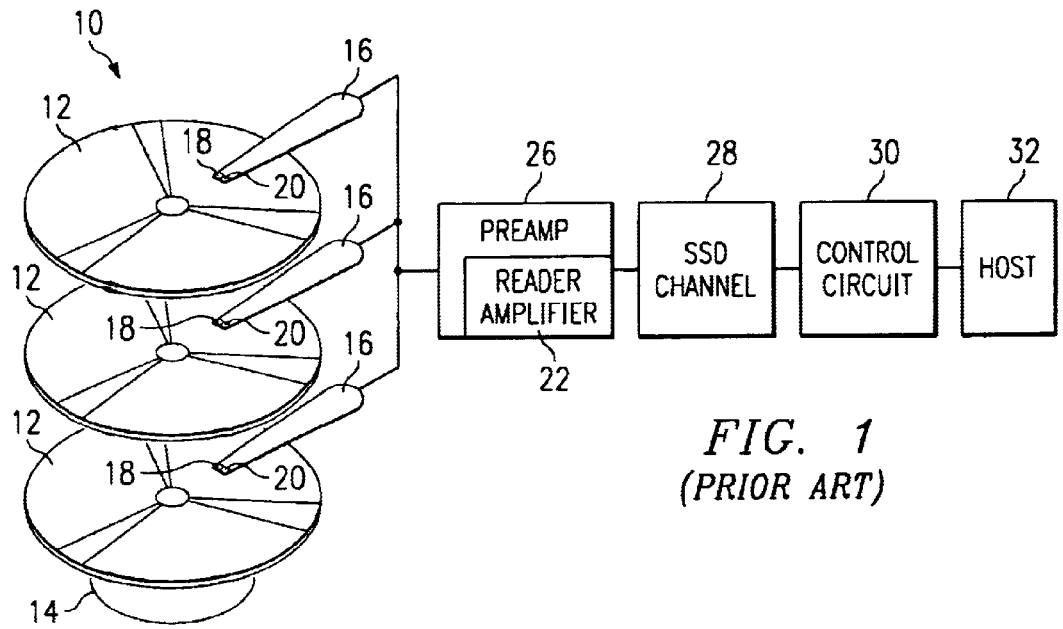
FIG. 1 illustrates a conventional disk drive system including multiple rotating disks or platters, read/write heads, a piezo actuator, a servo circuit, and associated amplifiers and control circuitry.
Figure 3A:
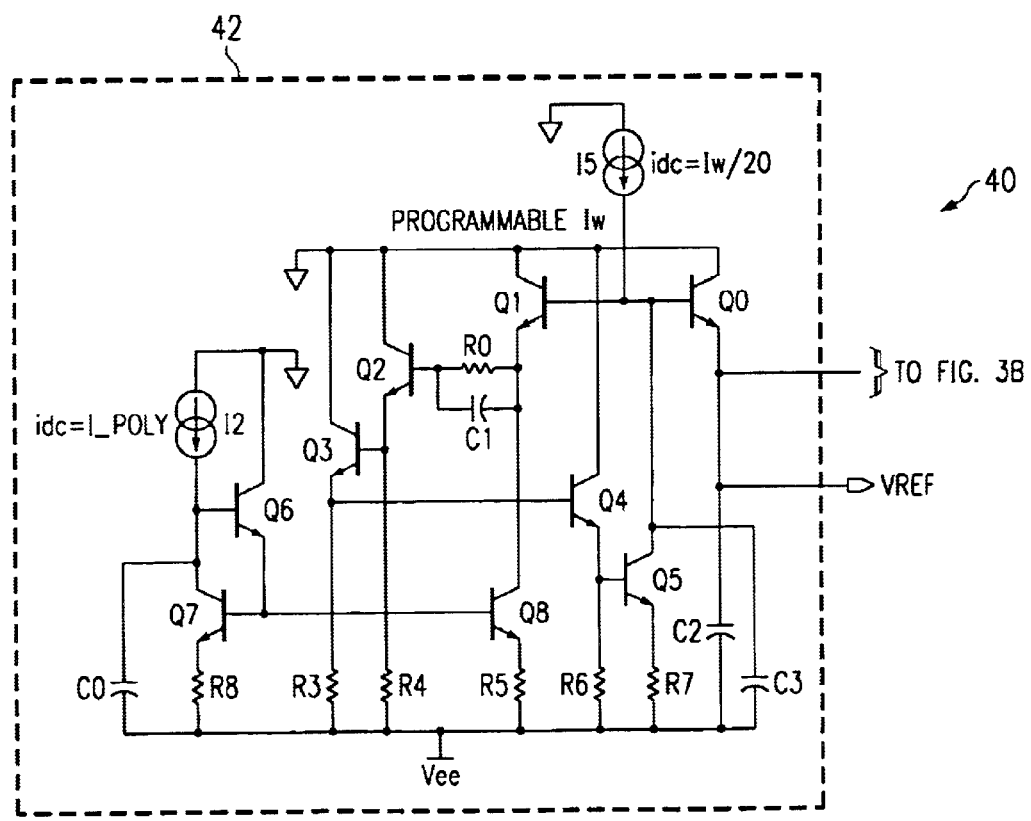
FIG. 3A and FIG. 3B are schematic diagrams of the write current reference circuit seen to be coupled to a write head via a series of cascaded emitter-follow transistors.

FIG. 3a shows how the voltage VREF is generated. Since the differential voltage created by reference voltage circuit 42 at nodes VN and VNn is buffered through three emitter-follower stages 44 to the bases of transistors Q17 and Q20, all the Vbe of transistors Q17, Q11, Q10, and Q9 are matched to the Vbe in the reference circuit 42. Transistors and resistors, which are matched and proportional to each other in device size and current density, are:

| VREF circuit | Write Head circuit |
| --- | --- |
| Q5 and R7 | Q15–Q17, Q18–Q20, and R12–R14 |
| Q4 and R6 | Q11, Q14, and R11, R15 |
| Q3 and R3 | Q10, Q13, and R10, R16 |
| Q2 and R4 | Q9, Q12, and R9, R17 |
| R0 | R1 and R2 |

In addition, current through transistor Q1 is matched and proportional to current through transistor Q0 i.e. current source I11–I12 and current through transistor Q8 are generated from the same poly current source.

Figure 5:
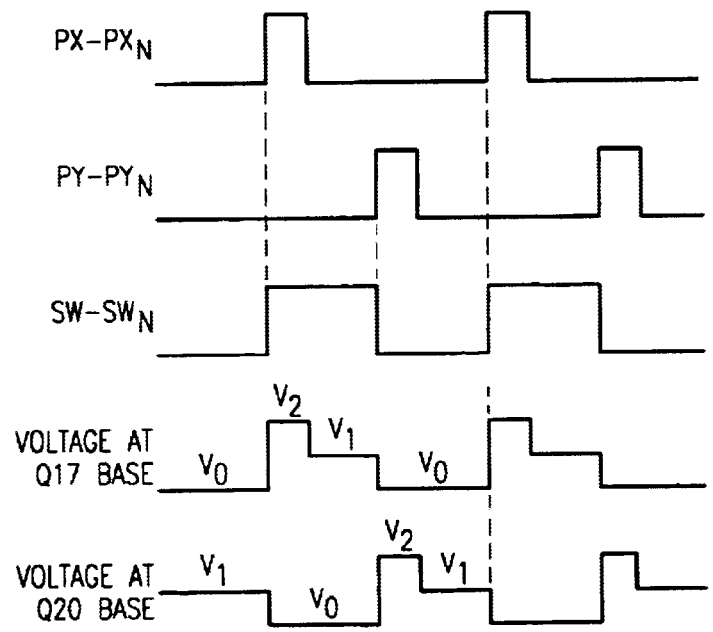
FIG. 5 is a waveform diagram illustrating the differential signals controlling the three sets of PMOS transistors, illustrating that the pulse duration is programmable by controlling the pulse duration of the boosting signals, and that the overshoot amplitude is controlled as well.

With reference back to FIG. 2, the differential write data signal across SW–SWn switches the write current polarity, while transistors PX–PXn and transistors PY–PYn provide boost current to produce the write current overshoot. The programmable write current pulse width is controlled by the pulse width of boosting signal PX–PXn and PY–PYn, as shown in FIG. 5. The programmable write current's overshoot amplitude is controlled by the tail current of the M9–M10 and M7–M8 transistor pair, which is generated from current source I1. Current source I1 is also a poly-resistor typed current.

To prevent breakdown of the PMOS transistors M5, M6, M8 and M10 cascaded PMOS devices M0–M3 are added. A small trickle current is used to partially bias the cascoded devices to improve the overall switching response. MOS transistors M12, M13, M14 and M16 provide the trickle currents to the cascoded devices. However, to maintain write current accuracy, the trickle currents are accounted for in the DC reference circuit 42, which eventually sets the accurate programmed write current. Therefore, transistor M18 provides an equivalent current to the base of transistor Q2 to compensate for the trickle current flowing through transistors M0 and M1. Transistor M21 provides an equivalent bias current to the emitter of transistor Q8 to compensate for the trickle current through cascaded transistor devices M2 and M3.

The write current accuracy is improved due to a feedback loop in the VREF circuitry 42. Feeding back the collector current of transistors Q5 to the bases of transistors Q0 and Q1 forms the feedback loop. Loop stability is achieved by capacitors C1–C3. Capacitor C1 and C3 provide the dominant pole to the loop. Feed forward capacitor C1 helps stabilize the inner feedback loop.

Figure 4:
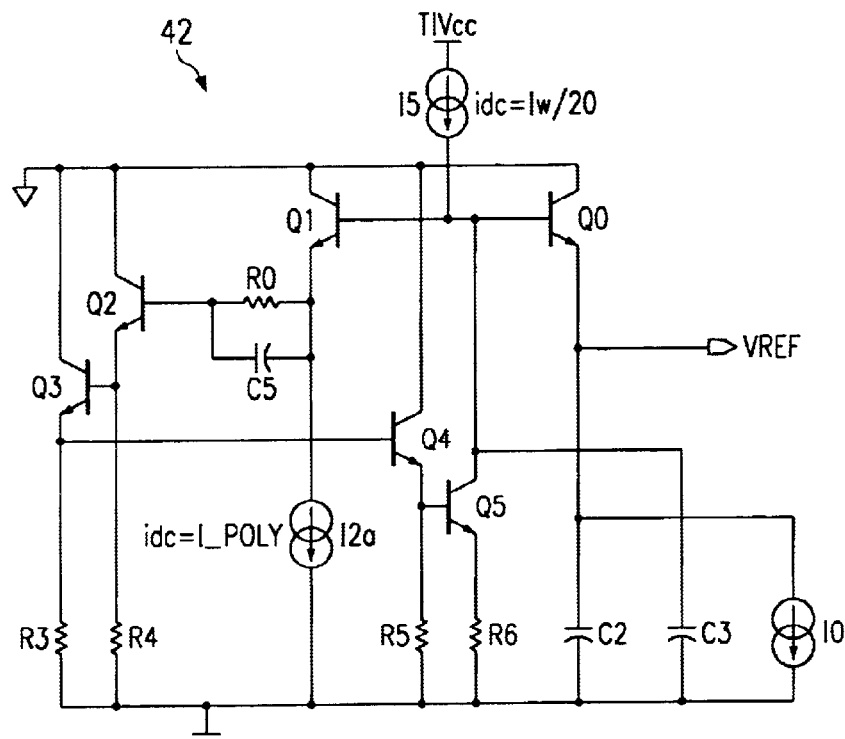
FIG. 4 shows a simplified schematic of the voltage reference circuit of FIG. 3 which is adapted to produce a very accurate write current.

FIG. 4 shows a simplified schematic of the voltage reference, which produces accurate write current.

In summary, circuit 40 provides an accurate write current that is independent of supply voltage, temperature, and if a process change is introduced. The circuit 40 also provides the ability to control three parameters of write current: DC amplitude, overshoot amplitude, and pulse duration.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A write current circuit for a mass media write head, comprising:
   a head write driver circuit adapted to drive the write head with a write current signal;
   a write current reference voltage circuit coupled to the head write driver circuit and adapted to selectively establish an amplitude of said write current signal; and
   a power supply coupled to the write current reference voltage circuit, wherein said write current is independent of said power supply.

2. The write current circuit as specified in claim 1 wherein said write current reference voltage circuit is adapted to set a DC write current to the write head.

3. The write current circuit as specified in claim 1 wherein said write current is also independent of temperature.

4. A write current circuit for a mass media write head, comprising:
   a head write driver circuit adapted to drive the write head with a write current signal; and
   a write current reference voltage circuit coupled to the head write driver circuit and adapted to selectively establish an amplitude of said write current signal,
   wherein said write current is also independent of processes utilized to fabricate said write current circuit.

5. A write current circuit for a mass media write head, comprising:
   a head write driver circuit adapted to drive the write head with a write current signal; and
   a write current reference voltage circuit coupled to the head write driver circuit and adapted to selectively establish an amplitude of said write current signal,
   wherein said write current reference voltage circuit includes a feedback loop feeding back transistor current to achieve loop stability.

6. The write current circuit as specified in claim 5 further comprising a feed forward capacitor adapted to stabilize the feedback loop.

7. A write current circuit for a mass media write head, comprising:
   a head write driver circuit adapted to drive the write head with a write current signal:
   a write current reference voltage circuit coupled to the head write driver circuit and adapted to selectively establish an amplitude of said write current signal; and
   a control circuit adapted to control multiple parameters of the write current.

8. The write current circuit as specified in claim 7 wherein the multiple parameters include write current amplitude.

9. The write current circuit as specified in claim 7 wherein the multiple parameters include write current overshoot amplitude.

10. The write current circuit as specified in claim 7 wherein the multiple parameters include write current pulse duration.

11. A write current circuit for a mass media write head, comprising:
    a head write driver circuit adapted to drive the write head with a write current signal; and a write current reference voltage circuit coupled to the head write driver circuit and adapted to selectively establish an amplitude of said write current signal, wherein the control circuit comprises a first set of transistors controlled by a boosting signal and providing a boost current to produce a write current overshoot.

12. The write current circuit as specified in claim 11 wherein the control circuit comprises a second set of transistors providing differential write data signals.

13. The write current circuit as specified in claim 12 further including a delay circuit delaying said differential write data signal, wherein an overshoot amplitude of the write current is programmable as a function of a delay time between the original differential write data signal and its programmable delayed version.

14. The write current circuit as specified in claim 13 wherein the differential write data signal has a controllable pulse width.

15. The write current circuit as specified in claim 14 wherein the pulse amplitude is controlled by a programmable current source.

16. The write current circuit as specified in claim 12 wherein the first and second set of transistors are cascoded and biased with a trickle current to prevent breakdown and improve transient switching time.

17. The write current circuit as specified in claim 16 wherein the trickle currents are compensated for in the write current reference voltage circuit to maintain write current accuracy.

18. The write current circuit as specified in claim 12 wherein both said first and second sets of transistors are comprised of PMOS transistors such that they can be driven hard to provide the adequate boost current and differential write data signals.

19. The write current circuit as specified in claim 11 wherein two sets of transistors are utilized to provide said boost current.

20. A method of controlling a write current circuit adapted to provide a desired write current to a write head, comprising the steps of:

coupling a write current reference voltage circuit to the write current circuit to produce a selectable write current signal amplitude, wherein the write current signal amplitude is selectively established independent of power supply voltage powering the write current reference voltage circuit.

21. The method as specified in claim 20 wherein the write current reference voltage circuit sets a DC write current.

22. A method of controlling a write current circuit adapted to provide a desired write current to a write head, comprising the steps of:

coupling a write current reference voltage circuit to the write current circuit to produce a selectable write current signal amplitude; and selectively establishing several parameters of the write current.

23. A method of controlling a write current circuit adapted to provide a desired write current to a write head, comprising the steps of:

coupling a write current reference voltage circuit to the write current circuit to produce a selectable write current signal amplitude, wherein the selectable parameters include write current amplitude, overshoot duration, and overshoot amplitude.

* * * * *